(No Model.) 7 Sheets—Sheet 1.
G. A. GILL.
SELF BINDER FOR HARVESTERS.
No. 373,454. Patented Nov. 22, 1887.
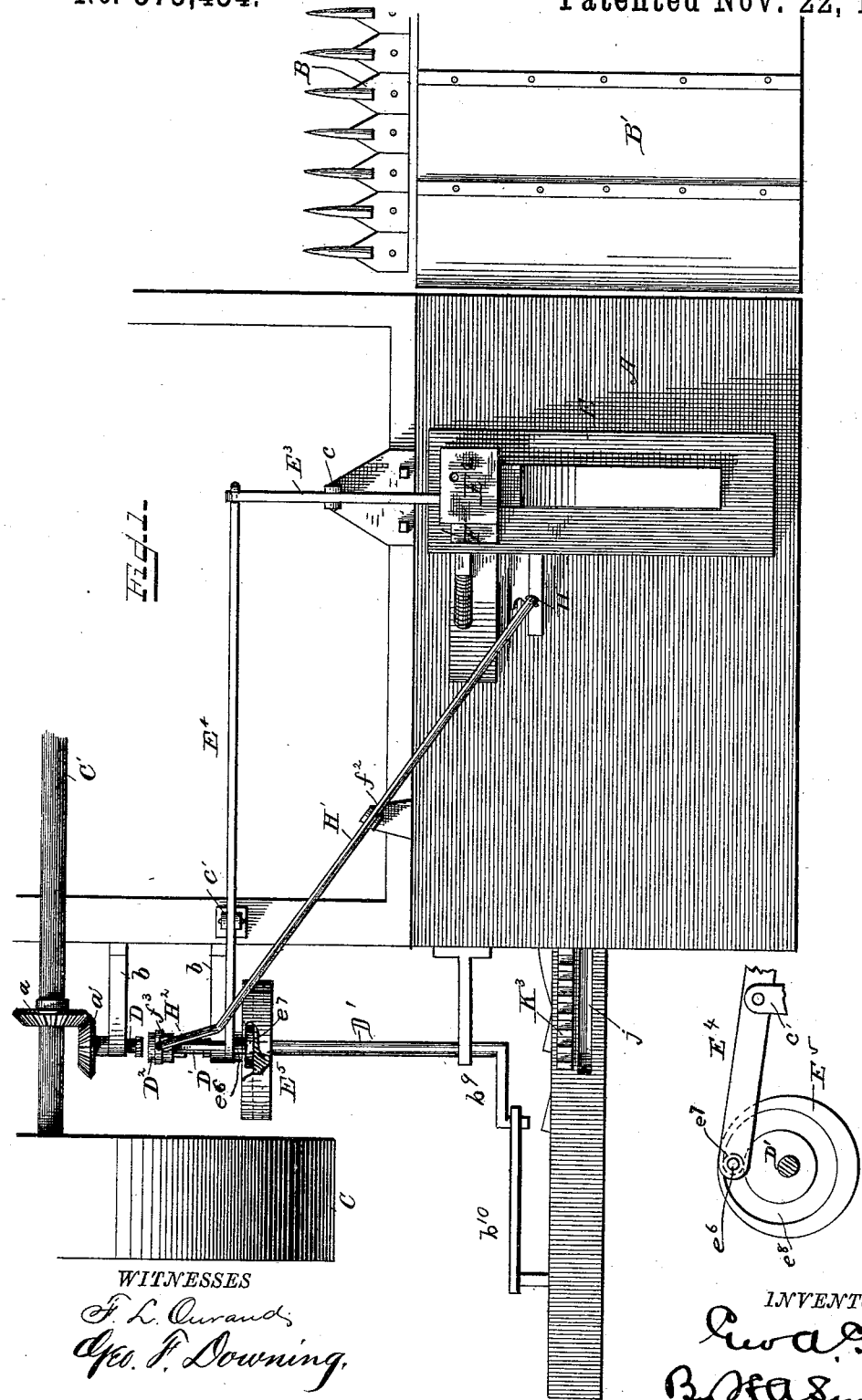
WITNESSES
F. L. Ourand
Geo. F. Downing
INVENTOR
Geo. A. Gill
By H. A. Symons
Attorney
N. PETERS, Photo-Lithographer, Washington, D. C.

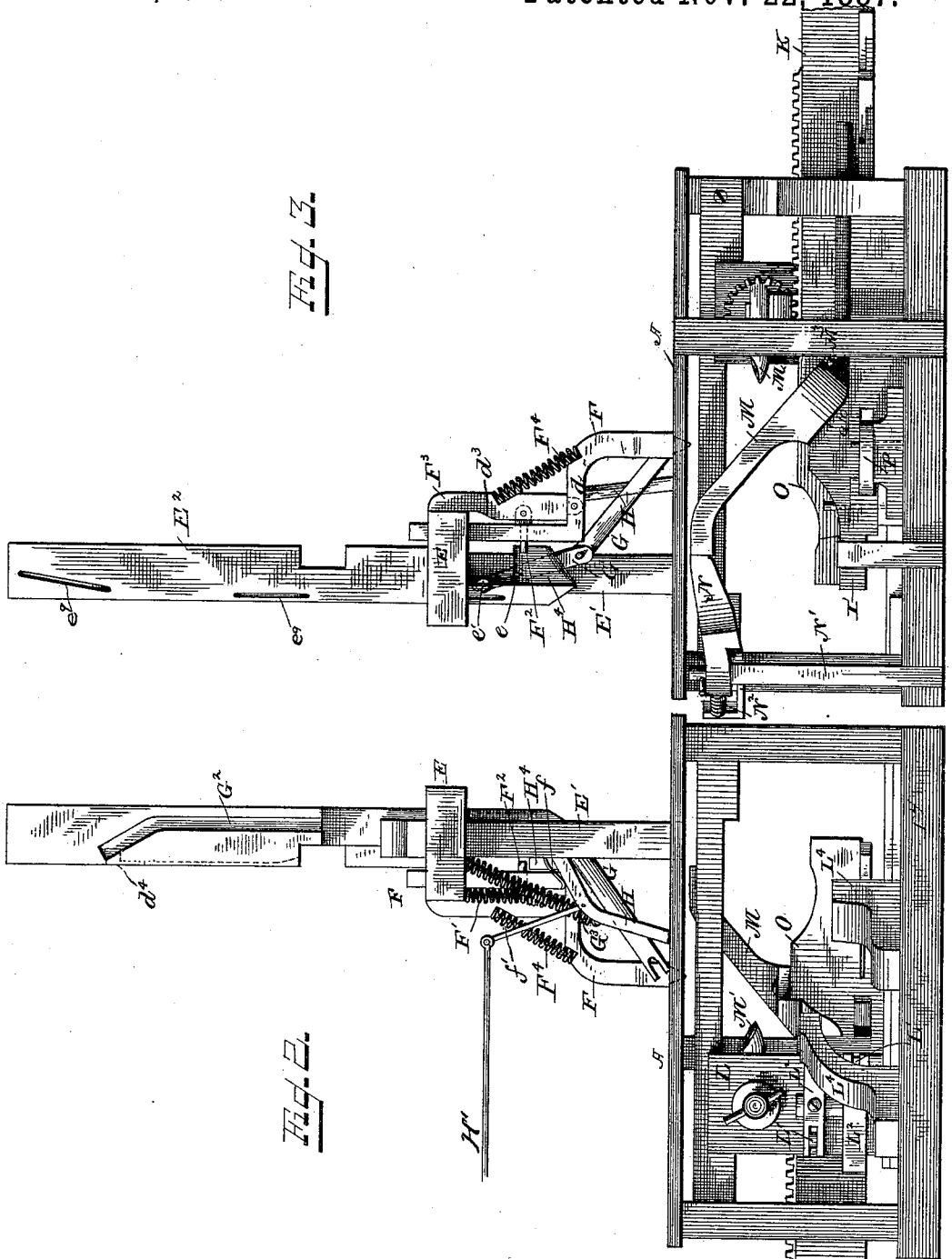

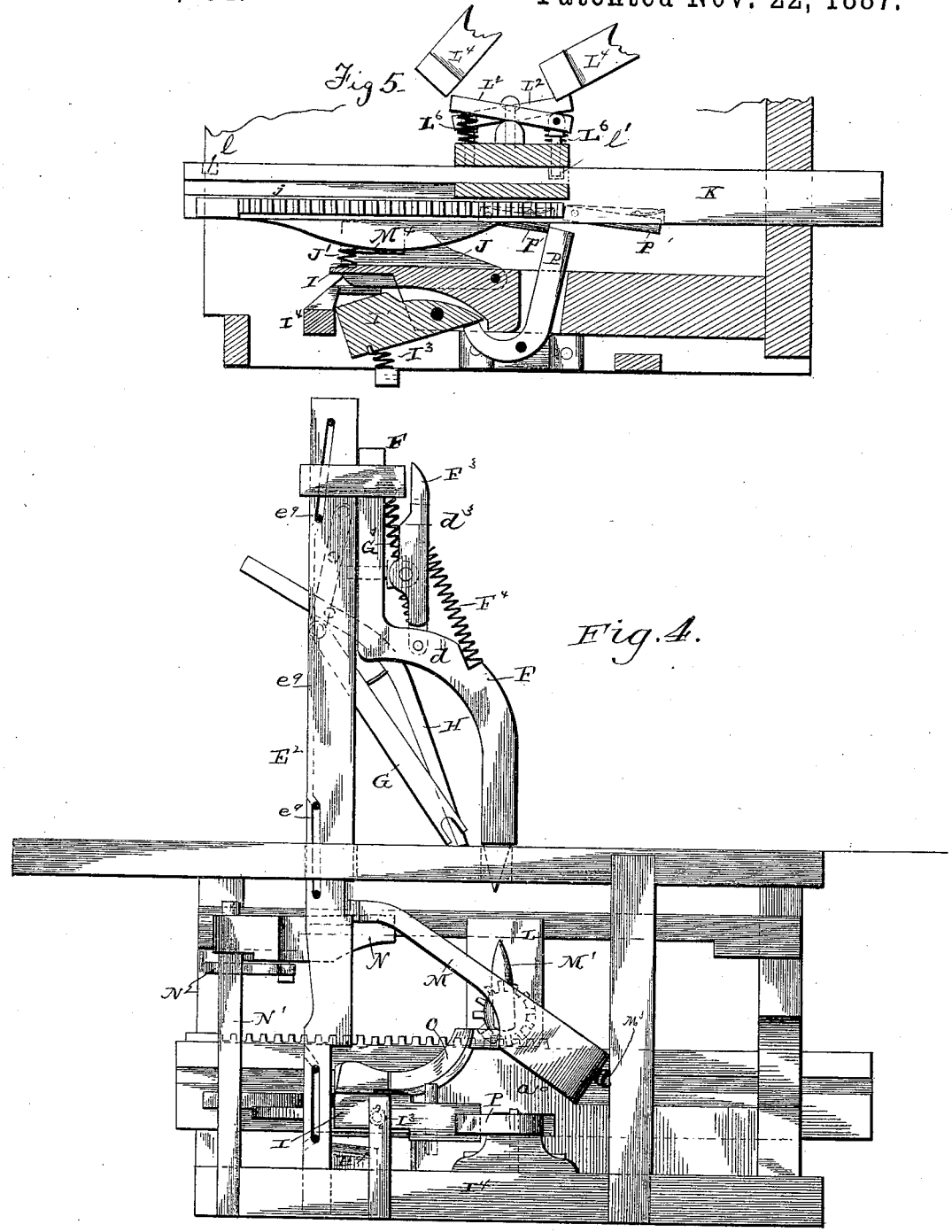

(No Model.)  7 Sheets—Sheet 4.

G. A. GILL.

SELF BINDER FOR HARVESTERS.

No. 373,454. Patented Nov. 22, 1887.

WITNESSES
F. L. Ourand
Geo. F. Downing

INVENTOR
Geo. A. Gill.
By H. A. Sugman
Attorney (No Model.) 7 Sheets—Sheet 5.
G. A. GILL.
SELF BINDER FOR HARVESTERS.
No. 373,454. Patented Nov. 22, 1887.
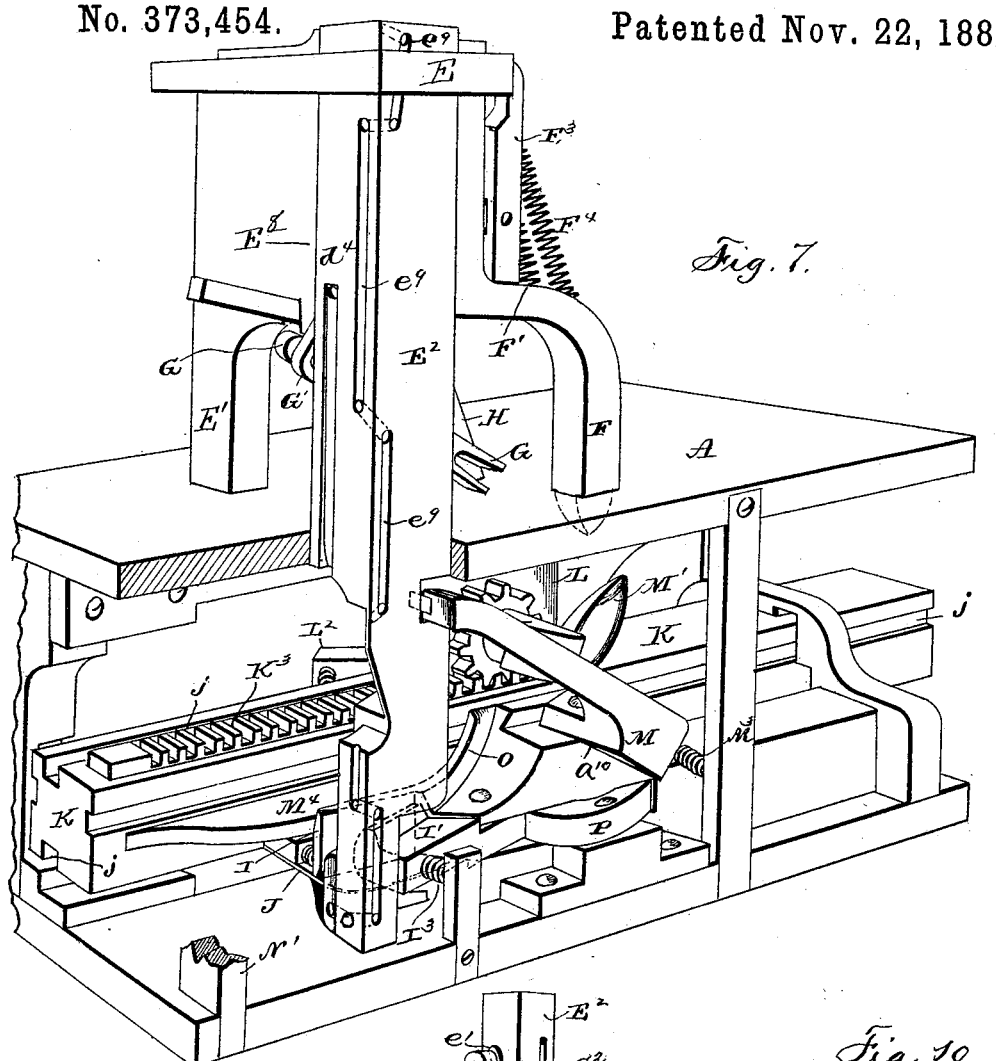
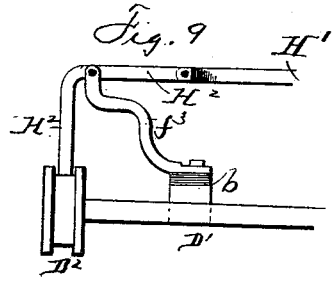
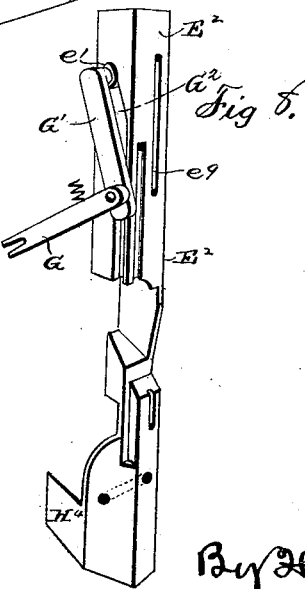
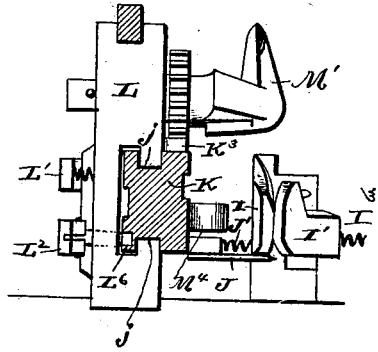
WITNESSES
Geo. F. Downing
S. G. Nottingham
INVENTOR
George A. Gill
By H. A. Seymour, Attorney (No Model.) 7 Sheets—Sheet 6.
G. A. GILL.
SELF BINDER FOR HARVESTERS.

No. 373,454. Patented Nov. 22, 1887.

WITNESSES INVENTOR
Geo. F. Downing George A. Gill,
S. G. Nottingham By H. A. Seymour Attorney (No Model.) 7 Sheets—Sheet 7.
G. A. GILL.
SELF BINDER FOR HARVESTERS.
No. 373,454. Patented Nov. 22, 1887.
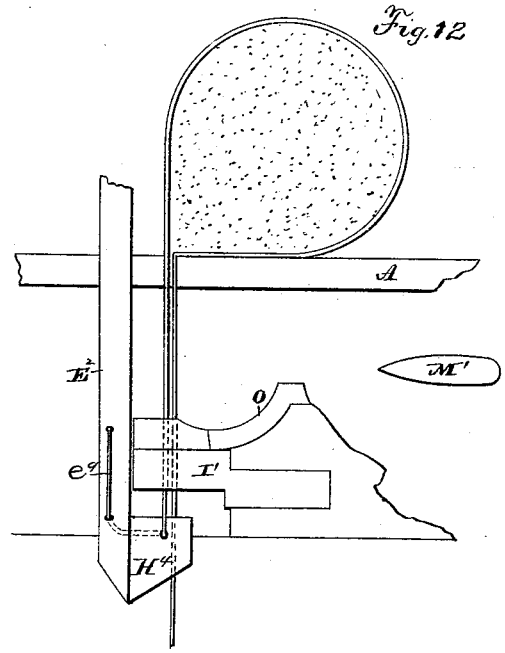
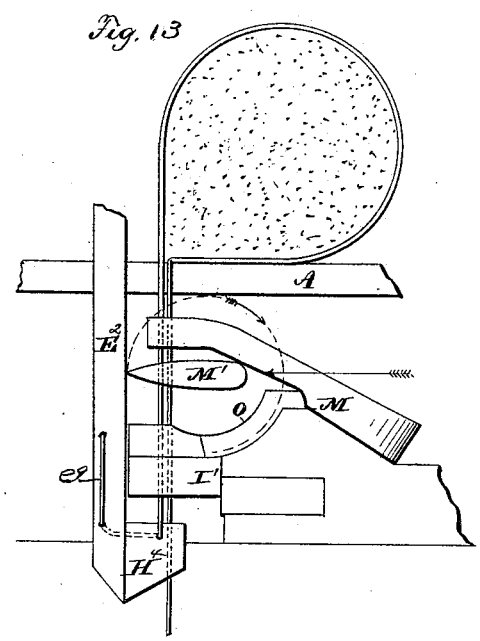
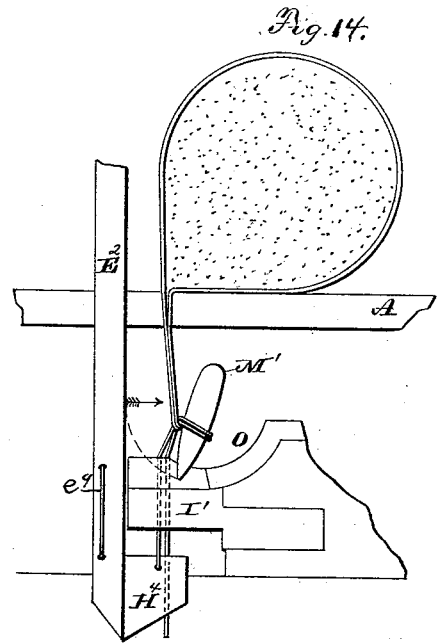
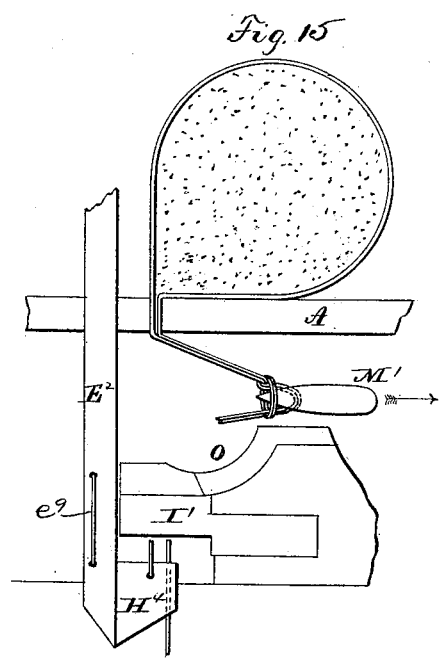
WITNESSES
F. L. Ourand
Geo. F. Downing
INVENTOR
Geo. A. Gill,
By H. A. Seymour,
Attorney

UNITED STATES PATENT OFFICE.

GEORGE A. GILL, OF MONROEVILLE, PENNSYLVANIA.

SELF-BINDER FOR HARVESTERS.

SPECIFICATION forming part of Letters Patent No. 373,454, dated November 22, 1887.

Application filed April 22, 1884. Serial No. 128,833. (No model.)

*To all whom it may concern:*

Be it known that I, GEORGE A. GILL, of Monroeville, in the county of Allegheny and State of Pennsylvania, have invented certain new and useful Improvements in Self-Binders for Harvesters; and I do hereby declare the following to be a full, clear, and exact description of the invention, such as will enable others skilled in the art to which it appertains to make and use the same.

My invention relates to an improvement in self-binders for harvesters, the object of the same being to provide positive acting devices for holding, cutting, and tying the cord; and it consists in the parts and combinations of parts, as will be more fully described, and pointed out in the claims.

Figure 6:
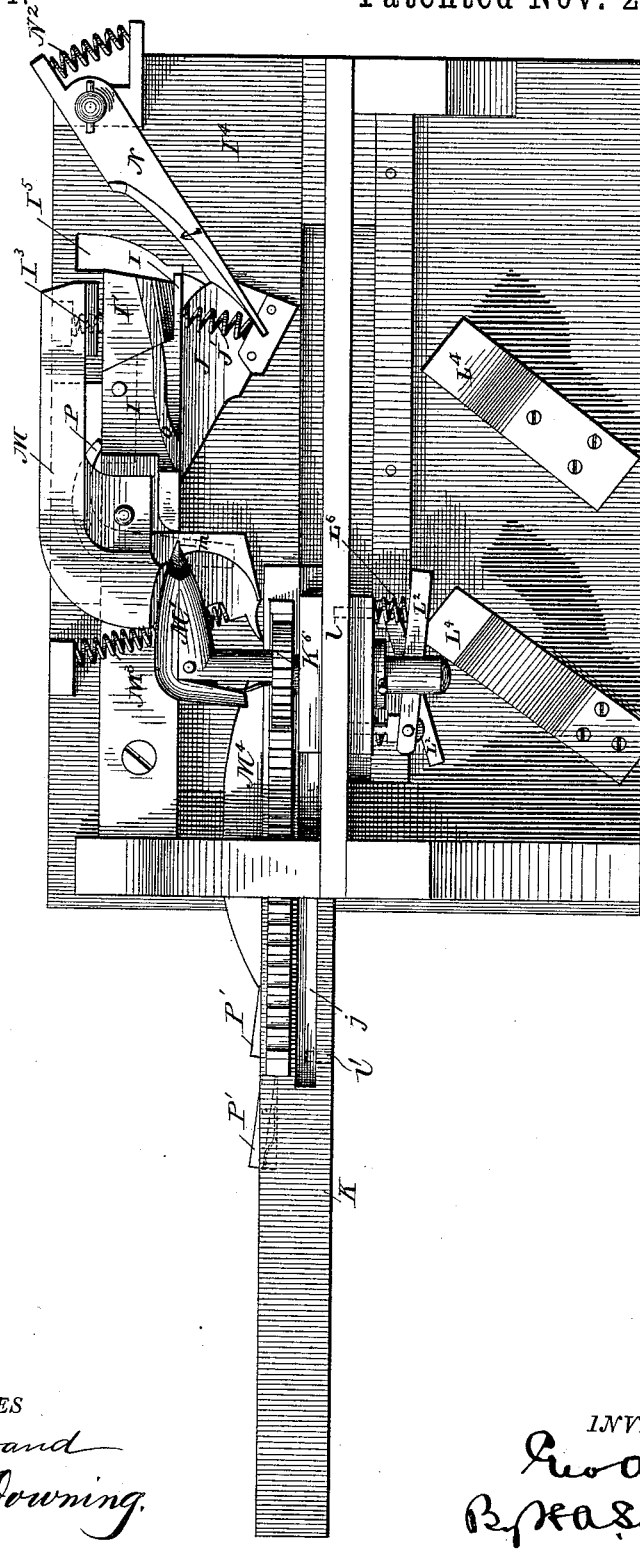
Figure 11:
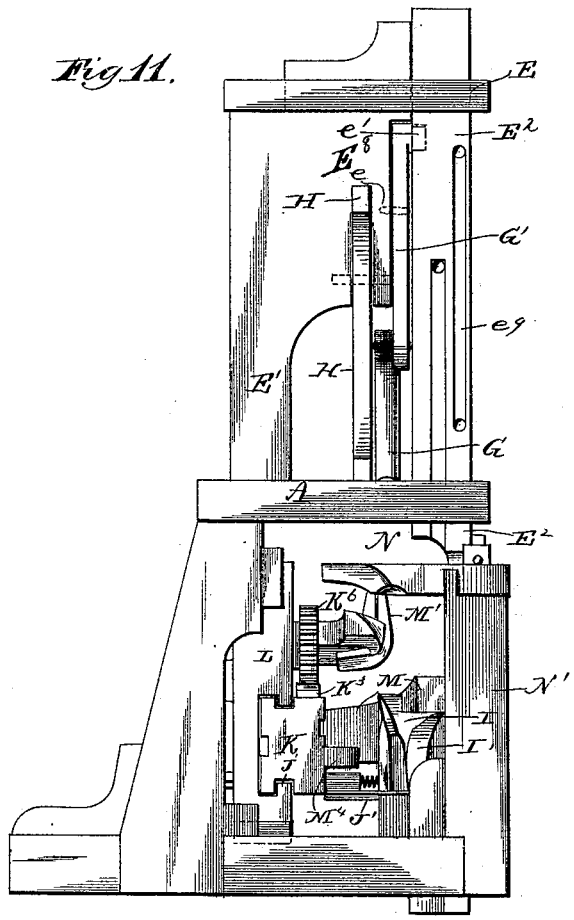

In the accompanying drawings, Figure 1 is a plan view of a machine embodying my invention. Fig. 2 is an enlarged view in rear elevation of my improved mechanism for forming the knot. Fig. 3 is a view of the same in front elevation. Fig. 4 is a similar view showing the parts in different positions. Fig. 5 is a horizontal sectional view showing the cord cutting and holding mechanism. Fig. 6 is a plan view of the tying mechanism with the platform removed; Fig. 7, a perspective view of the tying mechanism, a portion of the platform being removed. Fig. 8 is a detached view of the needle and ejector-arm, showing the mechanism for operating the latter. Fig. 9 is a detached view of the bell-crank lever $H^2$. Fig. 10 is a detached view of the knotter and operating mechanism, the cord holder and cutter. Fig. 11 is a view in elevation of the parts shown in Figs. 2 and 3, taken from the stubble side of the binder-platform; and Figs. 12, 13, 14, and 15 are views in elevation, showing the position of the several parts while tying a knot.

A represents a binder table or platform mounted on suitable wheels, and arranged at the end of the grain-receiving platform, which is provided with the cutters B and endless conveyer B', which latter delivers the grain onto the binder-table A. The ground or driving wheel C is rigidly secured to the shaft C', journaled in the frame of the machine and operating the entire mechanism. The shaft C' operates the cutters and conveyer by means of suitable connections, (not shown,) and is provided near the wheel C with the bevel-pinion $a$, which latter operates the tying mechanism through the intervention of the bevel-pinion $a'$ and two-part shaft D D'. This shaft is journaled in the brackets $b$, and is provided with a friction-clutch, $D^2$, by means of which the two parts of the shaft are locked and revolved simultaneously with the shaft C'. The part D of the shaft revolves continuously while the machine is in operation, and is to be connected with suitable packers.

The part D' of the shaft operates only when the binding mechanism is in action, and is provided with the cam-wheel $E^5$, which latter operates the cord-tying mechanism, as will be hereinafter more fully described. The overhanging arm E is rigidly secured to the upper end of the standard E', supported on the table A, and is provided with an open slot near one end, through which the needle $E^2$ passes. This needle is guided by the arm E, and is vertically reciprocated by the lever $E^3$, pivoted to the standard $c$. This lever $E^3$ is loosely connected at one end to the needle, and is connected at its front end to one end of the lever $E^4$, pivoted at the point $c'$ to the frame of the machine. The opposite end of this lever is provided with a pin, $e^6$, and anti-friction roller $e^7$, moving in a cam-groove, $e^8$, formed in the front face of the wheel $E^5$, as shown in dotted lines in Fig. 1, and in the detached view on Sheet 1 of the drawings, by means of which the lever is vibrated. The vibratory movement of the lever $E^4$ is transmitted to the lever $E^3$, and hence when the part D' of the two-part shaft is revolving the needle is being vertically reciprocated.

The arm E overhangs the needle-opening in the table, and is provided at one end with a slot in which the upper end of the vertically-movable compressor F works. This compressor is curved substantially as shown, so as to enable the grain to be packed under the horizontal portion $d$ thereof, and the lower end thereof is somewhat reduced in size and rests within a recess formed in the table A. This compressor is yieldingly held in position by the spring $F^4$, (shown in Fig. 2,) the lower end of which rests on the upper surface of the horizontal portion $d$ of the compressor, and as the grain is packed thereunder the compressor gradually rises a short distance, but still holds the gavel in position for the cord. After the gavel is bound it is necessary for the compressor to rise sufficiently high to enable the bundle to be ejected. This is accomplished by the dog $F^2$, pivotally secured to the lever $F^3$, which latter moves against one side or edge of the overhanging arm E. This dog is pivotally secured to the lever $F^3$ and passes through the compressor, and, when the needle is in a depressed position, enters the opening or recess $d^4$ therein near the upper end. Thus it will be seen that when the needle is elevated the compressor, being locked thereto, is also elevated a slight distance, and is released from engagement with the needle by the inclined face $d^3$ of the lever $F^3$ coming in contact with the arm E. The lever $F^3$ is pivotally secured at its lower end to the horizontal portion of the compressor, and is held in contact with the arm E by the spring $F^4$, the ends of which are secured, respectively, to the compressor F and lever $F^3$. This lever $F^3$ is provided with an inclined face, $d^3$, which, while the compressor is being elevated, comes in contact with the arm E and releases the dog $F^2$ from the recess $d^4$ in the needle. (Shown in dotted lines, Fig. 2.)

While the knot is being tied the needle rests in its lowest position, at which point the dog $F^2$ registers with the recess $d^4$. After the knot is tied the needle rises and carries with it the compressor-arm, which is locked thereto in the manner above described. When the inclined face $d^3$ of the lever $F^3$ comes in contact with the arm E, as the needle rises the dog $F^2$ is withdrawn and the spring $F^4$ immediately forces the compressor-arm down to its normal position. While the compressor-arm is in its elevated position the bundle is ejected by the ejector G. This ejector consists of a loosely-connected depending arm situated in close proximity to the compressor-arm and connected to and depending from one end of the lever $G'$, while the opposite end rests on the table and comes in contact with the bundle. The lever $G'$ is pivoted to the forwardly-projecting portion $E^8$ of the standard $E'$ at $e$, as shown in Figs. 3 and 11, and is provided at its upper end with an anti-friction roller, $e'$, which moves on the groove $G^2$, formed in one face of the needle $E^2$. This groove is straight throughout the greater portion of its length, while the upper portion thereof extends laterally at an angle of about forty-five degrees. While the roller $e'$ rests within the straight portion of the groove $G^2$ the ejector G remains stationary, but as soon as it enters the angular portion thereof the lower end of the arm $G'$ is thrown outward and causes the ejector to discharge the bundle. When the knotter is in operation, the needle is in its lowest position and the roller $e'$ stands in the extreme upper end of the groove $G^2$. The free end of the ejector-arm rests against the bundle. As soon as the needle begins to ascend, the roller $e'$, being then in the inclined or angular portion of the slot, is moved to one side and the ejector moved over to the position shown in Figs. 2 and 3. The ejector is held down in position by the spring $G^3$. The grain as it is forced under the compressor-arm elevates the free end of the ejector, which latter drops to the table after the gavel has been ejected.

In Figs. 2 and 3 the ejector is shown in the position it occupies just after ejecting a gavel, or while the grain is being fed under the compressor-arm. As soon as a sufficient quantity of grain to form a gavel has been placed under the compressor-arm, the needle descends to its lowest position, and the movement of the needle (by means of the inclined section of the groove $G^2$, before referred to) causes the ejector to move under the overhanging arm E. This movement of the ejector carries the free end thereof behind the gavel, and after the gavel has been tied the needle begins to ascend and causes the ejector to move out to the position shown in Figs. 2 and 3 and carry with it the gavel. The greater portion of the inclined section of the groove $G^2$ being below the hole $d^4$, as shown in Fig. 2, it follows that the ejector begins to eject the bundle as soon as the compressor begins to ascend, thereby enabling the ejector to discharge the gavel before the compressor falls and blocks the way.

H is a lever pivoted near its upper end to the forwardly-projecting portion $E^8$ of the standard $E'$, and resting at its lower end on the table A. This lever is yieldingly held on the table by the spring $f$, one end of which is secured to the portion $E^8$ of the standard $E'$, while the other end bears against the top of the lever H, and has connected to it an upwardly-projecting rod, $f'$, to which one end of the lever $H'$ is pivotally connected. This lever is pivoted at $f^2$ to a standard projecting from the binder-table A, and is connected at its other end to the horizontal arm of the bell-crank lever $H^2$, pivoted to the standard $f^3$. The lower bifurcated end of this lever $H^2$ partly embraces the sliding clutch $D^2$ and moves the latter into contact with the end of the part D of the shaft and locks the two parts together. This only occurs when the rear end of the horizontal arm of the bell-crank lever, to which the lever $H'$ is connected, is depressed. When the rear end of the horizontal arm of the bell-crank lever is elevated, the clutch is drawn back and the two parts of the shaft disconnected. As the grain is packed under the compressor-arm, it comes in contact with the lower end of the lever H and gradually elevates it until it has been raised to its highest position. When this point is reached, the clutch is thrown into engagement with the constantly-revolving part D of the shaft and the tying mechanism begins to operate.

As soon as the bundle is bound and ejected, the lower end of the lever H drops onto the table A and the clutch $D^2$ is withdrawn from the part D.

The needle $E^2$ is slightly reduced in size at its lower portion, to permit it to easily penetrate the grain, and is provided at its extreme lower end with the laterally-projecting lug H⁴, the upper and lower edges of which are made tapering, for a purpose to be hereinafter described. This needle is provided with cord-guides, which consist simply of groove $e^9$, arranged substantially as shown, forming a tortuous path throughout the length of the needle, constituting the tension, and the cord leaves the needle through an opening formed in the lower edge of the lug H⁴. This lug or projection H⁴ of the needle rises and falls in the same vertical plane with the cord-holder, which latter consists of a rigid jaw, I, and a movable jaw, I′, pivoted to the shank of the rigid jaw, as shown in Fig. 5.

The upper and lower adjacent edges of the jaws I and I′ are made flaring, to enable the lug H⁴ of the needle E to enter from above or below, and the movable jaw I′ is held against the rigid jaw I by the spring I³. The base-plate I⁴, on which the above parts are secured, is provided with a slot, I⁵, which conforms in shape to the contour of the lower end of the needle. Thus it will be seen that when the needle is threaded and lowered the cord is carried between the jaws I and I′, as shown in Fig. 12. At the commencement of the operation the cord is drawn down and secured between the jaws I I′ while the needle is in an elevated position. The machine is then ready for operation, and the grain is packed under the compressor-arm. When sufficient grain has been packed under the compressor-arm, the binding mechanism is thrown into gear and the needle caused to descend, carrying the cord over the gavel.

The lug H⁴ of the needle is constructed to fill the space between the jaws I I′ as the latter are opened by the passage of said lug. The needle in descending passes outside of the first end of the cord, or, that is, the first end of the cord rests between the lug H⁴ of the needle and the stationary jaw of the cord-holder; hence the lug H⁴, while passing between the jaws, clamps the said first end of the cord firmly against the rigid jaw of the cord-holder and prevents said end from escaping from between the jaws.

The instant the lug H⁴ leaves the jaws I and I′ the two ends of the cord are grasped by said jaws and held thereby until the knot has been tied and the cord cut, as will be hereinafter more fully described. The needle is now elevated, and as the free end of the cord hangs from the lower end thereof it is grasped by the jaws and held while the needle continues its ascent. The cord is thus carried up, and as the grain is packed under the compressor the cord is moved away from the needle. After the gavel is formed the mechanism is tripped by the parts described, and the needle again descends and carries the cord around the gavel and down through the jaws of the holder within reach of the cutter J, which latter is pivotally secured to the lower face of the shank of the rigid jaw I of the cord-holder. The cutter rests upon one side of a vertical line passing between the jaws I I′, and is moved over said line by the engagement therewith of the longitudinally-movable rack-bar K. This cutter moves in close contact with the jaws and between them and the lug H⁴ of the needle, and as the cord is held taut by the jaws and needle the cord around the bundle is easily severed by the single cutter when the latter is moved. The spring J′ yieldingly holds the cutter in its open position and permits the needle to move vertically without coming in contact therewith.

The rack-bar K, which operates the tying and cutting mechanism, is operated by the shaft D, the section D′ of which is continued rearwardly and terminates near the rack-bar in a crank, $b^9$, which latter is connected to the rack-bar by the pitman $b^{10}$. Any other construction that will reciprocate the rack-bar can be employed instead of the above.

The bar K is provided with teeth K³ on its upper surface, to engage the pinion on the knotter-shaft, and on both the upper and lower surfaces with longitudinal grooves $j$, in which the tongues formed on the block L, carrying the tying-bill, rests. This bar is also provided on one face with two recesses, l′, situated in different horizontal planes, one at each end of the line of teeth, in which dogs L′, pivotally secured to the spring-actuated levers L², mounted upon the knotter-carrying block, register.

L⁶ are springs secured to the block L and bearing against the free ends of their respective levers L², for the purpose of holding the dogs L′ in contact with the rack-bar. These dogs are adapted to enter their respective openings $l$ $l'$ in the bar K, and when so engaged lock the knotter carrying block to the bar, so that the former moves with the latter until disengaged by one of the stops L⁴. The block L moves in guides below the table A, and the levers L² are brought in contact with their respective stops L⁴, secured to the plate I⁴, by the movement of the bar K. The levers are situated in different horizontal planes, and each stop L⁴ is constructed to engage its respective lever. Thus when the block is nearly at one extreme, as shown in Fig. 6, the top lever, L², engages with its stop L⁴, and withdraws its dog from the upper opening, l′. This withdraws the dog attached to the lever, and leaves the bar K free to continue its movement without carrying the block any farther. When the bar K reaches the end of its stroke and starts back, the block still remains stationary until the opening $l$ reaches the lower dog, L′, when the dog enters its recess $l$, thus locking the knotter-carrying block to the bar, and the block L is caused to move until the lower lever, L², strikes the other abutment, L⁴. This releases the lower dog and allows the block to remain stationary. The block, with its tying-bill, is now opposite the needle, as shown in Fig. 13, and is in a position to engage the cord. While the block is moving to the position last mentioned, and before it stops, the upwardly-projecting and inclined cord-deflecting arm M is moved inwardly, and carries the cord out of its vertical line to the inner side of the bill, so that the jaws of the tying-bill M', which normally lie in a horizontal position, will pass to one side of the cord,—that is, the cord will rest in a position between the block L and the bill, as shown in Fig. 13. The cord-deflecting arm M is secured on the inclined seat or bearing $a^{10}$, formed or resting on the base $I^4$, as shown in Figs. 3 and 5, and is held in its normal position away from the needle and tying-bill by a spring, $M^3$. The upper end of this arm is located above the tying-bill, and the lower end thereof terminates alongside of the bar K, and as the latter is reciprocated the arm comes in contact with the cam $M^4$, formed or secured to the side of said bar, and imparts the movement to the arm M, the upper end of which rests in a line with the cord and carries the cord out of a direct line toward the block L and into a position to enable the bill to pass to one side of it. While this cord-deflecting arm is holding the cord in this position the tying-bill advances until it comes in contact with the inclined face of the arm N, which latter is situated above the bill. This arm is journaled to the post N', and yieldingly held in position to be engaged by the tying-bill by the spring $N^2$, and is for moving the cord in a direction away from the block L.

When the movement of the knotter-carrying block L ceases, the bar K continues to move and the knotter begins to revolve by means of the rack $K^3$ engaging the knotter-pinion $K^6$. As the knotter revolves, the front edges of the jaws thereof come in contact with the inclined lower edge of the arm N and moves the latter in the direction of the arrow shown in Fig. 6, and as the cord lies in the path of movement it is forced into a position on the outside of the bill, so that as the knotter revolves the cord will be wrapped once around the jaws thereof, as shown in Fig. 14.

The jaws of the knotter resemble the jaws ordinarily employed, and the movable jaw thereof at its outer free end is partly cut away, as shown at $m$, Fig. 6, forming an inclined shoulder, which latter comes in contact with the narrow ledge O, formed on the rigid jaw of the cord-holder, when the knotter is revolved, whereby the jaws are opened to receive the cord. This ledge is located in a vertical line passing between the jaws of the knotter, and hence when the edge of the movable jaw comes in contact with the ledge, and is moved outwardly thereby, the rigid jaw rests on one side of said ledge and the movable jaw on the other side thereof. This ledge gradually widens as it approaches the slot $I^5$, and consequently opens the jaws of the knotter. The rigid and movable jaws of the cord-holder form a continuation of the ledge O, and as the cord is held between the cord-holders it is carried between the jaws of the knotter—that is, the jaws move upwardly while in an open position, and as the cord is held between the cord-holder jaws I and I' in the line of movement of the knotter it follows that the knotter-jaws pass on opposite sides of the cord. As soon as the jaws leave the ledge they snap together and catch and hold the cord, and then continue their revolution until they come to their original horizontal position. The two strands of the cord thus grasped by and between the jaws of the knotter lie in a position between the loop previously formed around the jaws, and the knotter and rack-bar K are in the position shown in Fig. 15, with the exception that the knotter is in a position opposite the cord-holders. The bar K is now moving to the right, as shown in Fig. 15, and draws the ends of the cord which are confined between the jaws through the loop, which by the same movement is caused to slip off the jaws and forms the knot, as shown in Fig. 8. As soon as the two ends of the cord are grasped by the holder-jaws I and I', and before the knotter has arrived at the position it occupies, the end of the rack-bar K strikes the edge of the cutter J and forces it against the cord and cuts the latter.

After the knot is tied the ends of the cord around the bundle are still held between the jaws I I', and as the rack-bar K is moved back, or to the position shown in Figs. 2 and 3, the inner end of the bell-crank lever P (shown in Fig. 4) comes in contact with the projecting ends of the spring-actuated dogs P', pivotally secured in recesses formed in the bar K, and opens the movable jaw I' and leaves the cord attached to the bundle free to be withdrawn.

While the bundle is being tied the needle is in its depressed position, with its lug $H^4$ below the holding-jaws I and I'. After the knot has been tied and the ends of the cord around the bundle released by the movement of the bell-crank lever P, the needle begins to ascend. The jaws I and I' are now in a closed position, and are opened by the passsge of the lug $H^4$ of the needle engaging, as already described, with the lower flaring edges of said jaws. The free end of the cord, which was left hanging from the needle by the last operation of the cutters, is caught between the jaws as the needle passes up therebetween and held therein.

The bar K only operates while tying the knot, and only requires one movement back and forth to tie the knot and cut the cord. After the knot has been tied and the bundle ejected the needle ascends and the operation is repeated.

It is evident that numerous slight changes in the construction and relative arrangement of the several parts might be resorted to without departing from the spirit of my invention, and hence I would have it understood that I do not confine myself to the exact construction shown and described, but consider myself at liberty to make such changes as fairly fall within the spirit and scope of my invention.

Having fully described my invention, what

I claim as new, and desire to secure by Letters Patent, is—

1. The combination, with a vertically-sliding needle, of a sliding compressor-arm located alongside of the needle, devices for locking the compressor-arm to the needle, and a rigid stop for releasing the compressor-arm, substantially as set forth.

2. The combination, with a vertically-sliding needle and a frame for supporting and guiding the upper end thereof, of an ejector loosely secured to said frame and operated by the needle.

3. The combination, with a vertically-sliding needle, a vertically-sliding compressor-arm operated thereby, and devices for engaging and disengaging the needle and compressor-arm, of an ejector operated by the needle.

4. The combination, with a vertically-sliding needle and a vertically-sliding compressor-arm, of a spring-actuated dog for locking the compressor-arm to the needle when the needle is down.

5. The combination, with an arm overhanging the binder-table, a vertically-sliding needle guided in said arm, and a vertically-sliding compressor-arm, of a spring-actuated dog for locking the compressor-arm to the needle when the needle is down, and a lever carried by the compressor-arm and having an inclined shoulder to engage the arm as the needle rises, for withdrawing the dog and releasing the compressor-arm from the needle.

6. The combination, with a rotary knotter, of a stationary cord-holding jaw, a movable jaw, a vertically-movable needle adapted to open said jaws, a spring located behind the movable jaw for yieldingly holding the latter in contact with the stationary jaw, a cutter located below the jaws, and a reciprocating bar for rotating the knotter and moving the cutter toward the cord, substantially as set forth.

7. The combination, with a needle, a rotary knotter, and a reciprocating rack-bar for operating the knotter, of a cord-deflecting arm operated by contact with the rack-bar, and the lever N, operated in one direction by contact with the knotter and in the other direction by a spring, substantially as set forth.

8. The combination, with a rotary knotter, a vertically-sliding needle, the stationary and movable cord-holding jaws, a deflecting-arm for carrying the cord to the knotter, and a cutter located below the cord-holding jaws, of a reciprocating bar for rotating the knotter and moving the cutter toward the cord, substantially as set forth.

9. The combination, with a rotary knotter, a vertically-sliding needle, and the cord-holding jaws located in the path of the needle, and also in the path of rotation of the knotter, the said jaws being opened by the entrance of the needle between them, and a cutter located below the jaws, of a reciprocating bar for rotating the knotter and for moving the cutter toward the cord, substantially as set forth.

10. The combination, with a reciprocating rack-bar and a block loosely mounted on said bar and locked thereto, of a tying-bill journaled in said block and provided with a pinion, by which it is rotated, and devices for automatically releasing the block from the bar.

11. The combination, with a needle, a sliding block, a rotary knotter journaled in said block, and a pinion secured to the knotter, of a rack-bar engaging the pinion, devices for locking the sliding block to the rack-bar, whereby they are caused to move together, and devices for releasing the block from the rack-bar, whereby the latter is permitted to move independently of the block and rotate the knotter, substantially as set forth.

12. The combination, with a vertically-sliding needle, a sliding block, a rotary knotter journaled in said block, and a pinion secured to said knotter, of a sliding rack-bar, spring-actuated dogs for locking the sliding block to the rack-bar, and stops for withdrawing the dogs, whereby the bar is permitted to move independently of the block and rotate the knotter, substantially as set forth.

13. The combination, with a needle, cord-deflecting arm, sliding block, and tying-bill journaled in said block, of a sliding bar for moving the block, rotating the tying-bill, and operating the cord-deflecting arm, substantially as set forth.

14. The combination, with a needle, cord-deflecting arm, sliding block, and tying-bill journaled in said block, of a sliding bar for moving the block, rotating the tying-bill, and operating the cord-deflecting arm, and devices for automatically locking and unlocking the block and bar, substantially as set forth.

15. The combination, with the stationary and movable cord-holding jaws, of the bell-crank lever P, engaging the movable jaw, a sliding bar, and catches pivoted to said bar and adapted to engage one end of the bell-crank lever, substantially as set forth.

16. The combination, with a sliding block, a tying-bill journaled in said block, a cord-deflecting arm, and a cord-cutter, of a sliding bar for moving the block, rotating the tying-bill, and operating the cord-cutter and cord-deflecting arm, substantially as set forth.

In testimony whereof I have signed this specification in the presence of two subscribing witnesses.

GEORGE A. GILL.

Witnesses:
GEO. F. DOWNING,
S. G. NOTTINGHAM.